Jan. 3, 1967    G. E. EWERTZ    3,296,423
AVERAGE BEARING RATE COMPUTER AND SEMI-AUTOMATIC PLOTTER
Filed June 30, 1961    4 Sheets-Sheet 1

INVENTOR.
GORDON E. EWERTZ
BY
Lawrence S. Epstein
ATTORNEY

Jan. 3, 1967 G. E. EWERTZ 3,296,423
AVERAGE BEARING RATE COMPUTER AND SEMI-AUTOMATIC PLOTTER
Filed June 30, 1961 4 Sheets-Sheet 2

INVENTOR.
GORDON E. EWERTZ
BY
Lawrence S. Epstein
ATTORNEY

INVENTOR.
GORDON E. EWERTZ

Jan. 3, 1967 G. E. EWERTZ 3,296,423
AVERAGE BEARING RATE COMPUTER AND SEMI-AUTOMATIC PLOTTER
Filed June 30, 1961 4 Sheets-Sheet 4

INVENTOR.
GORDON E. EWERTZ
BY
Lawrence S. Epstein
ATTORNEY

United States Patent Office 3,296,423
Patented Jan. 3, 1967

3,296,423
AVERAGE BEARING RATE COMPUTER AND
SEMI-AUTOMATIC PLOTTER
Gordon E. Ewertz, Uncasville, Conn., assignor, by mesne assignments, to the United States of America as represented by the Secretary of the Navy
Filed June 30, 1961, Ser. No. 121,265
3 Claims. (Cl. 235—150.271)

This invention relates in general to position plotters and in particular to a new and improved apparatus which computes and plots the bearing rate automatically; this bearing rate being the bearing rate of a moving target relative to a moving ship.

A principal object of the instant invention is to provide an improved navigation device which computes and presents visually, the bearing rate between two moving ships.

Another object of the instant invention is to provide an improved navigation plotting device which presents continuous solutions for both course and range between a moving ship and a moving target.

A further object of the instant invention is to provide an improved bearing rate computer indicator in combination with an improved semi-automatic bearing rate plotter which is simple in operation and construction and is small in size.

Other objects and many of the attendant advantages of this invention will be readily appreciated as the same become better understood by reference to the following detailed description when considered in connection with the accompanying drawings wherein.

Figure 1A:
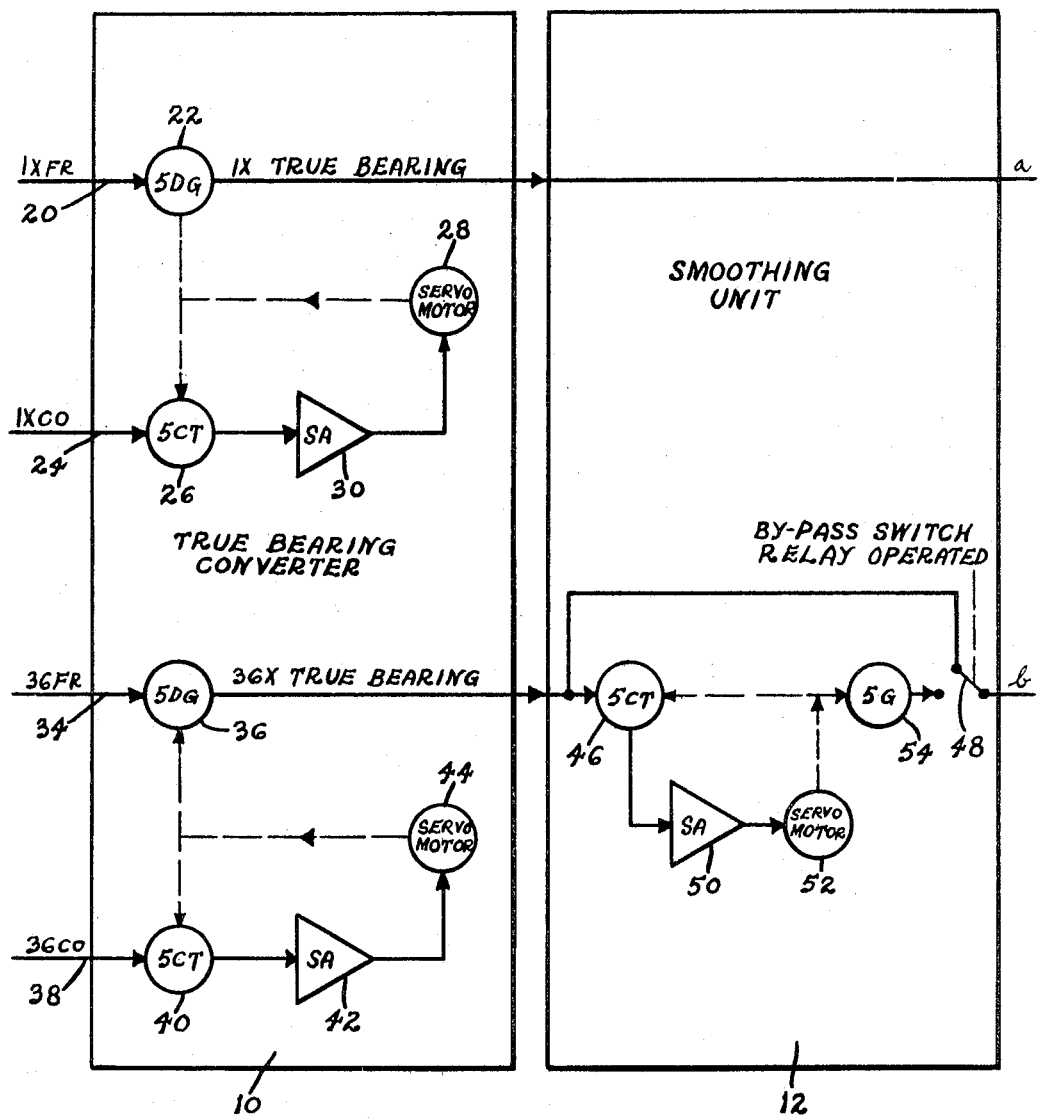
FIGS. 1a, 1b and 1c are a block schematic diagram of the bearing rate computer and plotter.
Figure 1B:
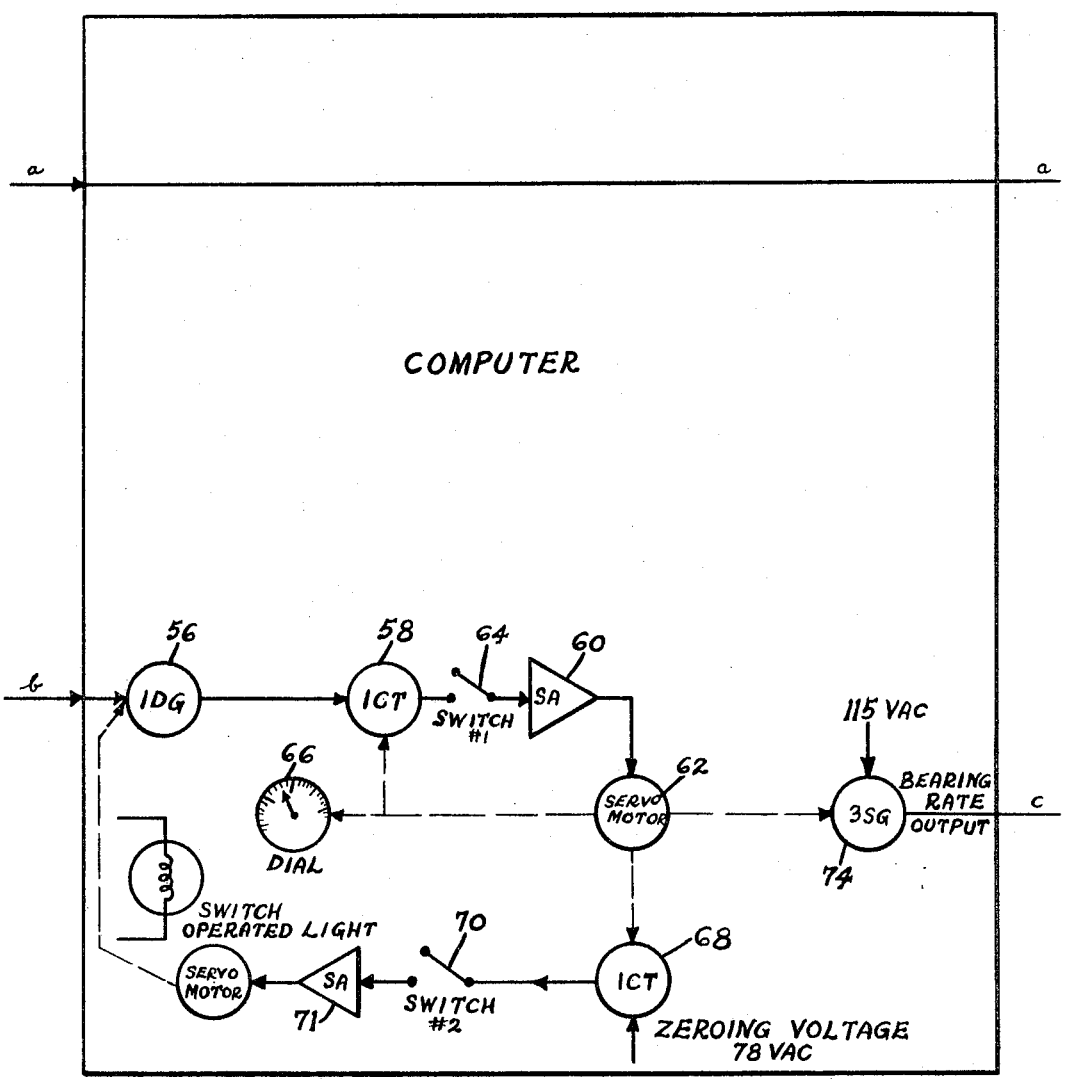
Figure 1C:
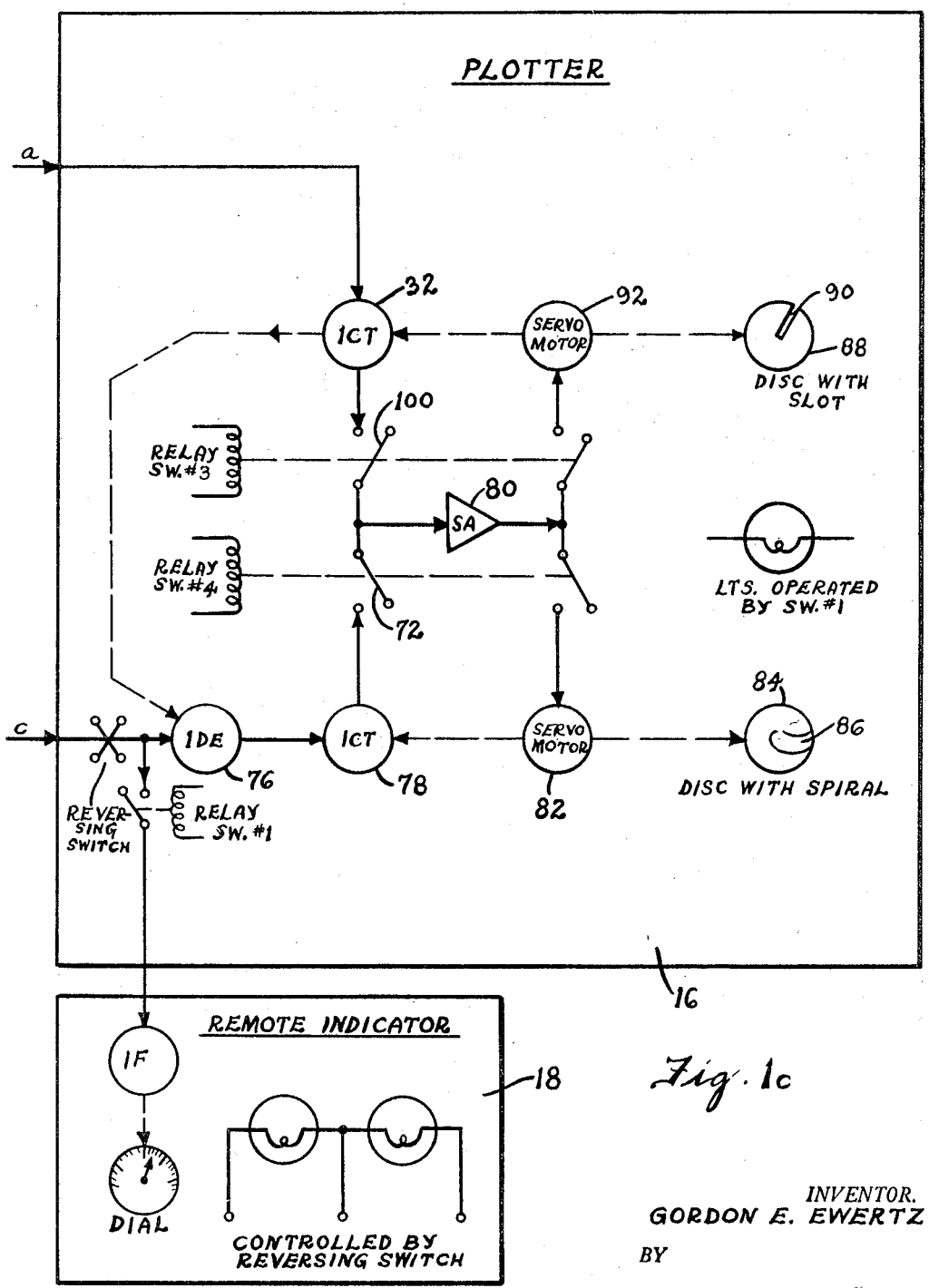

Referring now to the figures, we have the true bearing converter 10, the smoothing unit following the true bearing converter 12, the average bearing rate computer 14 following the smoothing unit and the plotter 16 following the computer. A remote indicator 18 is also connected to the computer and the plotter.

The true bearing converter 10 performs two target bearing conversions: one to single and one to 36 speed data; the 36 speed conversion being a high speed vernier for the single speed one. A conversion from relative target bearing to true target bearing in both the single and 36 speed cases is accomplished by vectorially adding the ships's own course and the relative target bearing in a differential device. The bearing information for the target is fed into the true bearing converter at 20 to differential generator 22. The ship's course information is fed into the true bearing converter at 24 to control transformer 26. The differential generator 22 and the control transformer 26 are both driven by servo motor 28. The error produced by control transformer 26 is amplified by servo amplifier 30 and drives servo motor 28 to correct the error output from control transformer 26 to zero. The movement of servo motor 28 also drives differential generator 22. The output of the differential generator 22 is then the true bearing. This output is fed through smoothing unit 12 and computer 14 to control transformer 32 in the plotter 16. The 36 speed bearing information is fed into the true bearing converter 10 at point 34, and applied through differential generator 36 to the smoothing unit. The ship's course information 36 speed is applied to the true bearing converter at point 38 to control transformer 40. The error output of control transformer 40 is amplified by servo amplifier 42 and applied to servo motor 44 which drives control transformer 40 in a direction to correct the error output to zero and at the same time drives differential generator 36. The output of differential generator 36 is then 36 times the true bearing. This 36 speed true bearing is applied to the smoothing unit 12. It is applied to control transformer 46 and also applied to bypass switch 48. Switch 48 bypasses the smoothing unit action in long range operation. In short range operation the 36 speed data is filtered for removal of spurious transient variations. The operation of the smoothing unit is conventional in that the input to the control transformer produces an error which is amplified by servo amplifier 50, the output of servo amplifier 50 being used to drive servo motor 52. Servo motor 52 drives control transformer 46 to produce zero error output and at the same time drives output generator 54 to produce a 36 times bearing output. The output from generator 54 is applied to computer unit 14 at differential generator 56. The output of differential generator 56 is set to control transformer 58 where any bearing change appears as an error signal which is amplified by servo amplifier 60 and then applied to drive servo motor 62. Switch 64 operates according to the timing sequence shown in FIG. 2. The servo motor 62 drives an indicator 66 which is calibrated in degrees of bearing change per minute. The dial is calibrated this way because the change in dial reading is from zero to some value over the period of time that switch 64 is closed, thus giving a rate of bearing change. Servo motor 62 also drives control transformer 68 to null out the error signal. This error signal is applied through switch 70 and to servo amplifier 71 and then to control transformer 58. Averaging of the bearing rate data is accomplished by taking output data over only one-half of the period of the input data. In the overall system, averaging is accomplished at switch 72 in the plotter 16 which is closed for only the second half of the input period. Synchro generator 74 in the computer section 14 converts the motor 62 mechanical data to electrical data. After the average bearing rate data is passed on to the plotter, the indicator 66 must be repositioned back to zero so that a new bearing rate computation can be made. This is achieved by two simultaneous operations: the first being the elimination of the error between the bearing rate indicator which will stop for a period determined by the timing sequence and the actual present bearing; and then the zeroing of the indicator by a zeroing voltage applied along with the present bearing error to a control transformer which will eventually afford through a servo loop a signal to the differential generator 56, thus driving the indicator 66 back to zero. This entire zeroing operation is possible only when switches 64 and 70 are both closed.

After the bearing rate is computed at the output of synchro generator 74, the signal is applied to the plotter 16 where it is combined in the differential generator 76 with the bearing at which the rate was computed and passed through a servo loop comprising control transformer 78, a servo amplifier 80 and servo motor 82, the motor driving a disk 84 with spirals 86 cut in it. The reason for the spiral which is logarithmic is that the rate of bearing change is a logarithmic function. Before the spiral cut is positioned, a second disk 88 with a radial slot 90 cut in it, is positioned in accordance with single speed, true bearing data by a servo loop comprising control transformer 32, servo amplifier 80 and servo motor 92. Disks 84 and 88 are concentrically mounted above lamps 94 and 96. When the spiral cut and the radial cuts coincide, a hole is formed through which the light from lamps 94 and 96 shines onto a transparent Lynch Plot mounted above the disk 98. The beam of light defines the point which is marked to show bearing rate at a particular angle on Lynch Plot.

Figure 2:
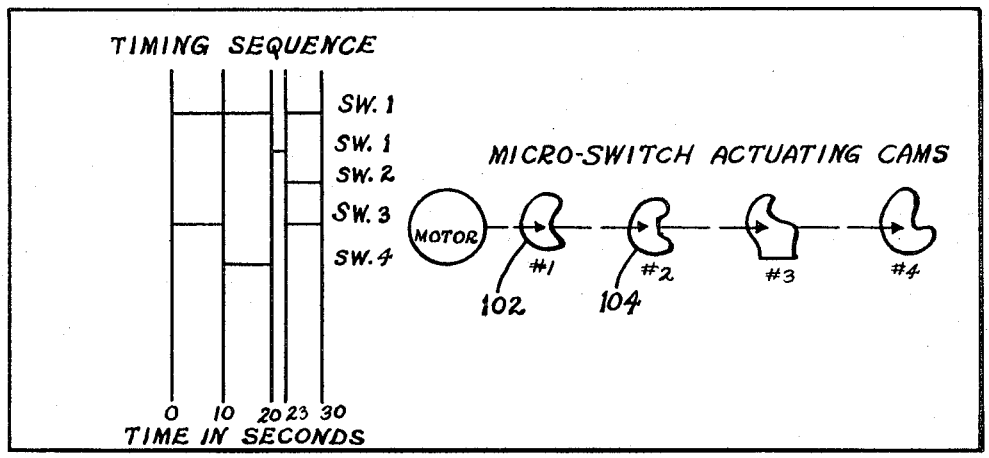
FIG. 2 is a block schematic diagram of the timing circuits for the bearing rate computer and plotter.
Figure 3:
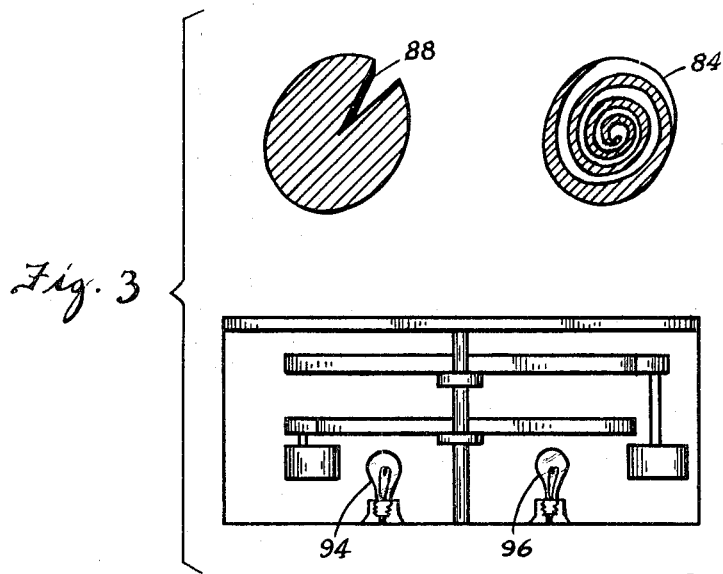
FIG. 3 shows the structure of the plotter.

The light from bulbs 94 and 96, switches 100 and 72 are all energized according to timing sequence shown in FIG. 2. This timing sequence is as follows: starting from zero the bearing servo follows a 36 speed bearing input for a period of twenty seconds determined by cam 102. The servo is then disabled and a solution lamp is illuminated for a period of four seconds determined by cam 104. The sectors set circuit is energized for a period of six seconds, and during this third period, the dial is reset to zero by means of a servo driving a differential generator and also the bearing servo catches up with the bearing angle that elapsed during the second or read period. This program then repeats itself. Consequently, a fresh bearing rate solution is presented twice each minute with no cumulative error. The dial is calibrated to give bearing rate in degrees per minute.

Obviously many modifications and variations of the present invention are possible in the light of the above teachings. It is therefore to be understood that within the scope of the appended claims the invention may be practiced otherwise than as specifically described.

What I claim is:

1. Position plotting apparatus of the character described for indicating average bearing rate of a target with respect to a ship comprising in combination, a bearing rate computer, said computer receiving target bearing data, said target bearing data being supplied to differential means, said differential means being operatively connected to drive a first control transformer, said control transformer providing an error, said error signal being amplified by a first amplifier means to drive motor means, said motor means being operatively connected to servo generator means for providing bearing rate output, said servo motor also being operatively connected to second control transformer means, said second control transformer means having zeroing means and being operatively connected to a second amplifier means for amplification of said second control transformer error voltage output, said second servo amplifier output being operatively connected to drive a servo motor, the output of said second servo motor being operatively connected to said first differential means, said first servo motor means being operatively connected to said first control transformer means and to an indicator whereby said indicator provides an indication of the continuous bearing rate of the target with respect to the ship.

2. A target tracking and plotting device comprising, a true bearing converter, said converter receiving single and 36 speed target relative bearing data from a sonar receiver, and single and 36 speed own course data from a compass providing single and 36 speed target true bearing data at said converter's output terminals, a smoothing unit electrically coupled to said converter's output terminals and providing filtering of said 36 speed true bearing data during short range operation, a bearing rate computer electrically coupled to and receiving said single and 36 speed data from said smoothing unit and providing single speed true bearing and average bearing rate data at said computer's output terminals and a target plotting device adapted to furnish a plot of average bearing rate and true bearing on a Lynch Plot, said average bearing rate computer operating over periods comprising four sequential increments of time, comprising an input differential generator, a first switch operable during the first two of said sequential timing increments, a first control transformer electrically connecting said first switch to said differential generator, a first servo motor mechanically linked to said control transformer to null out error signals, a first servo amplifier electrically connecting said first servo motor to said first switch, said motor being driven by error signals originating at said first control transformer, an indicator mechanically linked to said first motor and calibrated in target bearing per time, said time being equal to the first two of said sequential time increments, a second switch operable only during the second of said sequential time increments, a synchro generator mechanically linked to said first servo motor and electrically coupled to and providing said second switch with bearing rate signals, said switch's half-time operation providing averaging of said bearing rate data, a third switch operable during the fourth of said sequential time increments, a second control transformer receiving indicator zeroing voltages and being mechanically linked to and whose rotor is positioned by said first servo motor and electrically coupled to said third switch, a second servo motor mechanically linked to and serving as a second input to said differential generator during indicator zeroing operations and a second servo amplifier electrically connecting said third switch to said second servo motor.

3. A target bearing rate plotter for use with so-called Lynch Plots comprising, a first control transformer receiving input single speed true bearing signals and serving as a source of error signals, a servo amplifier, first switch means electrically coupled to said first control transformer and said servo amplifier, a first servo motor mechanically linked to said first control transformer to null out said error signals, second switch means mechanically linked to said first switch means, and electrically coupled to said servo amplifier of said first servo motor, a disk mechanically linked to said first motor provided with a single slot, said disk slot being rotationally positioned by bearing signals during periods when switch means one and two are closed, a differential generator mechanically linked to said first control transformer to receive present true bearing signals and receiving as a second input, average bearing rate data, third switch means electrically coupled to said servo amplifier and said first switch means, a second control transformer electrically coupled to said differential generator and said third switch means and providing bearing rate error signals, a second servo motor mechanically linked to said second control transformer to null out error signals, fourth switch means electrically coupled to said servo amplifier, said second switch means and said servo motor, said fourth switch means being also mechanically linked to said third switch means, a second disk provided with a spiral shaped slot and rotatably driven by said second servo motor to position said spiral slot, said second disk being mounted concentrically with said first disk, and a light source adapted to project light through the intersection of said disk slots onto a Lynch Plot, said first and second switch means being operable over one-half a time period, and the third and fourth switch means being operable over the complementary time period.

References Cited by the Examiner
UNITED STATES PATENTS

| | | | |
|---|---|---|---|
| 2,844,313 | 7/1958 | Seliger | 235—187 |
| 2,928,593 | 3/1960 | Crooke | 235—61.55 |
| 3,090,958 | 5/1963 | Brown | 235—150.26 X |

MALCOLM A. MORRISON, *Primary Examiner.*

WALTER W. BURNS, JR., *Examiner.*

D. M. ROSEN, A. J. SARLI, *Assistant Examiners.*